Patented Jan. 22, 1952

2,583,327

UNITED STATES PATENT OFFICE 2,583,327

COPOLYMER OF ACRYLONITRILE AND AN ETHYLENIC DICARBOXYLIC ACID MONO-ESTER OF A CYANOALCOHOL

Gaetano F. D'Alelio, Pittsburgh, Pa., assignor to Koppers Company, Inc., a corporation of Delaware No Drawing. Application February 25, 1949, Serial No. 78,470

19 Claims. (Cl. 260—78.5)

This invention relates to new copolymers of acrylonitrile. More specifically, it is related to the polymerization products of polymerizable masses comprising acrylonitrile and an ethylenic alpha, beta-dicarboxylic acid monoester of a cyanoalcohol, hereinafter referred to as a cyanoalcohol monoester, polymerized in the presence or absence of other monoethylenic copolymerizable compounds. This invention also deals with compositions of these copolymers adapted to the formation of shaped articles, in many cases to molecularly oriented shaped articles, particularly to fibers, threads, bristles, monofilaments, etc., hereinafter referred to as fibers, and other shaped articles such as films and the like, which articles show improved dyeing properties.

It has been known for some time that certain copolymers of acrylonitrile may be adapted to the preparation of shaped articles, such as films, fibers, foils, tubes, etc. Some of these copolymers have been regarded as capable of being cold-drawn to produce structures molecularly oriented along the fiber axis. Cold-drawing may be defined as the stretching of a polymeric material at a temperature below the melting point of the material to give a molecularly oriented structure.

The resistance of acrylonitrile polymers to dyes of all types has presented serious dyeing problems, especially in the development of synthetic fibers from these polymers. In fact, in order to dye polyacrylonitrile one commercial process resorts to the use of high pressures with water solutions or dispersions of dyes. It has been proposed that improvement in dye susceptibility can be obtained by the use of itaconic acid in small amounts as a copolymerizing monomer in the preparation of acrylonitrile polymers. However, the polymer products obtained thereby have a tendency to crosslink upon standing at temperatures of at least about 70–80° C. or upon spinning from hot solutions. Such cross-linking causes spoliation of material by gelation during storage, embrittlement of fibers, fouling of spinning jets, and other production difficulties.

Applicant's copending applications Serial Numbers 69,621 and 69,622, filed January 6, 1949, disclose the use of itaconic monoesters, such as monomethyl itaconate, with acrylonitrile to give acrylonitrile copolymers have excellent dyeing properties together with a reduction of the tendency for cross-linking and spoilation which accompanies the incorporation of itaconic acid in acrylonitrile polymers. However, when especially large proportions of itaconate monoester are used in the acrylonitrile polymers there is a decrease in the solvent resistance of the polymers and in other properties dependent on the high secondary bonding force of the acrylonitrile cyano groups.

It has now been found that very useful acrylonitrile polymer compositions having improved dyeing properties can be prepared by a process of polymerizing a polymerizable mass comprising monomeric acrylontrile and, as a copolymerizing reagent, an ethylenic alpha, beta-dicarboxylic acid monoester of a cyanoalcohol having less than 5 carbon atoms.

Ethylenic alpha, beta-dicarboxylic acids whose cyanoalcohol monoesters can be used in the practice of this invention include maleic, fumaric, itaconic, citraconic, aconitic acids, etc. The cyanoalcohols which may be used in the preparation of these monoesters have the formula HO—Z—CN, where Z is a divalent aliphatic group of less than 5 carbon atoms. Such cyanoalcohols include cyano-methanol, 2-cyano-ethanol, 1-cyano-ethanol, 2-cyano-propanol-1, 3-cyano-propanol-1, 1 cyano-propanol-2, 4-cyano-butanol-1, 3-cyano-butanol-2, 3-cyano-butanol-1, 4-cyano-butanol-2, etc.

The cyanoalcohol esters described herein are readily prepared by reacting the cyanoalcohol with the ethylenic alpha, beta-dicarboxylic acid anhydride or mono-acid chloride. For example, mono-(1-cyano-ethyl) maleate is readily prepared by heating together one mole of 1-cyano-ethanol with one mole of maleic anhydride until the monoester is prepared. This maleate monoester is readily isomerized to the fumarate monoester by heating it in the presence of a small amount of an inorganic acid such as sulfuric acid or a cation exchange resin containing sulfonic acid groups.

Although even smaller amounts are somewhat effective, the improvement in dye susceptibility of acrylonitrile copolymers becomes particularly noticeable when the cyanoalcohol monoester is present in the copolymer at concentrations of about 0.5 percent and the dye susceptibility increases as the amount of monoester in the copolymer is increased. Since the secondary-valence bonding force of the cyano group in the cyanoalcohol monoester approximates the secondary-valence bonding force of the cyano group in acrylonitrile, a considerable proportion of the cyanoalcohol monoester may be present in the acrylonitrile polymer molecule without deleteriously affecting the physical properties of the polymer. For example, acrylonitrile copolymers containing as much as 30 percent cyanomethanol monoesters or 2-cyanoethanol monoesters have good solvent resistance, tensile strength, etc.

The copolymers of this invention show great affinity toward many dyes, especially basic dyes and cellulose acetate dyes. Basic dyes containing amino groups, both substituted and unsubstituted, are particularly effective. It appears that the acid groups of the copolymers become attached to the amino groups of the dye molecules by chemical reaction or salt formation, thereby giving fast and more lasting properties to the dyed products. The basic dyestuffs toward which these copolymers show great affinity are advantageously those which contain amido, alkylamido, or ammonium groups, such as $-NH_2$, $-N(CH_3)_2$, $-N(C_2H_5)_2$, $-N(CH_3)_3OH$, etc. and which may also be used in the form of their salts, i. e. the hydrochlorides, sulfates or oxalates. Some of these basic dyes are Methylene Blue, Rhodamine B, Indamine Blue, Auramine, Meldola's Blue, Chrysoidine Y, Acridine Yellow, Magenta, Crystal Violet, Thioflavine T, Safframine and Bismarck Brown. The cellulose acetate dyes which are effective with these copolymers are mainly amino-anthraquinone derivatives, basic azo compounds and other basic substances, such as the Duranol, Dispersol, Sericol, etc. dyestuffs.

The acrylonitrile copolymers discussed herein are soluble in N,N-dimethyl acetamide (DMA), N,N-dimethyl formamide (DMF) and a number of similar solvents, used alone or in conjunction with N,N-dimethyl cyanamide, N,N-dimethyl cyanoacetamide, N,N-dimethyl methoxy-acetamide, methylene dinitrile, methylene di-thiocyanate, formyl caprolactam, formyl morpholine, tetramethylene sulfone, etc. Tetra-alkyl ureas of the formula

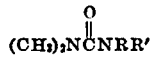

can also be used as solvents, in which formula R and R' are methyl, ethyl, propyl, isopropyl, etc. Solvents of this latter type, such as N,N,N',N'-tetramethyl urea, are disclosed in the applicant's copending application, Serial Number 187,689, filed September 29, 1950. Nitroalkanes, such as nitromethane, may be used as solvents for such copolymers having no more than about 85 percent acrylonitrile, providing the comonomers used in preparing such copolymers do not have substituent groups of equal or greater secondary bonding force than the cyano groups in acrylonitrile. Copolymers of the present invention which have high proportions of monomers of relatively low secondary-valence bonding strength, such as vinyl chloride, may often be dissolved in acetone or mixtures of acetone and solvents of the above types.

This invention will be more fully described by the following examples which illustrate methods of practicing the invention. In these examples and throughout the specification, "parts" and "percent" are intended to mean parts by weight and percent by weight.

*Example I*

Five polymers of acrylonitrile are prepared from the following monomer compositions:

| Acrylonitrile | Mono-Cyanomethyl Itaconate | Copolymer Soluble In |
|---|---|---|
| parts | parts | |
| 100 | 0 | DMA, DMF, TMU, etc. |
| 99.9 | 0.5 | DMA, DMF, TMU, etc. |
| 95 | 5 | DMA, DMF, TMU, etc. |
| 85 | 15 | DMA, DMF, TMU, etc. |
| 70 | 30 | DMA, DMF, TMU, etc. |

The 100 parts of monomer, or monomer mixture, is, in each case, slowly added over a period of less than an hour to 750–1000 parts of distilled water at 30–50° C. containing dissolved therein 0.6 to 1 part of ammonium persulfate, 0.6 to 1.5 parts of sodium bisulfite, and 0.5 part of sodium dodecyl-benzene sulfonate. The reaction is continued for 1–3 hours, at which time a yield of about 90 percent solid polymer is precipitated. The resulting polymers have molecular weights over 10,000 and acid number approximately theoretical. Each polymer is dissolved in N,N-dimethyl acetamide, N,N-dimethyl formamide or N,N,N',N'-tetramethyl urea and a film cast from each solution.

A solution of methylene blue dye (a basic dye) is prepared by making a paste of the dye with 1 percent by weight of dye solution. This dye solution is kept boiling for one hour while the aforementioned films are immersed therein for one hour. The dyed films are then removed and separately subjected to washing with boiling water for one hour, the boiling water being changed frequently to remove the desorbed dye. The unmodified polyacrylonitrile film shows only a light tint, whereas the mono-cyanomethyl itaconate copolymers are a deep and dense shade. Identical films, cold-drawn and heat-treated, show dyeing characteristics similar to the undrawn films.

Fibers are spun from the same solutions as above, either by dry spinning, or by wet spinning into glycerine baths. The fibers are substantially freed from solvent and dried. After cold-drawing the dried fibers 600–800 percent at 130–145° C. and subsequently heat-treating them at 150° C. for one hour, the fibers are given the same dyeing and washing treatment described above with the same results as for the films, a light tint being acquired by the unmodified polyacrylonitrile fibers and a deep and dense color being given to the mono-cyanomethyl itaconate copolymer fibers.

Instead of the mono-cyanomethyl itaconate of the above example, various other mono-cyanoalkyl itaconates, maleates, fumarates, citraconates and aconitates may be used, such as prepared from 2-cyano-ethanol, 1-cyano-ethanol, 2-cyano-propanol-1, 3-cyano-propanol-1, 1-cyano-propanol-2, 4-cyano-butanol-1, 3-cyano-butanol-2, 3-cyano-butanol-1, 4-cyano-butanol-2, etc., to give similar improvements in dyeing characteristics.

*Example II*

The procedure of Example I is repeated for the polymerization of the following monomer compositions:

| | Acrylonitrile | Vinyl Chloride | Mono-(2-cyanoethyl) Maleate | Copolymer Soluble In |
|---|---|---|---|---|
| | pt. | pt. | pt. | |
| A | 90 | 5 | 5 | DMF, DMA, TMU, etc. |
| B | 85 | 10 | 5 | DMF, DMA, TMU, etc. |
| C | 80 | 15 | 5 | DMF, DMA, TMU, etc. |
| D | 75 | 20 | 5 | $NO_2Me$. |
| E | 55 | 40 | 5 | Do. |
| F | 35 | 60 | 5 | Acetone. |

Sometimes nitromethane solutions of copolymers D and E may have gelled, partially dissolved particles known as fisheyes. In such cases, the solubility may be improved by the addition of small amounts of materials which are good solvents for acrylonitrile polymers, such as dimethyl formamide, dimethyl acetamide, tetramethyl urea, etc.

In addition, certain materials which are relatively poor solvents for polyacrylonitrile, such as diethyl formamide, diethyl acetamide, diethyl propionamide, etc., may be added to improve the solubility. Also, when acetone solutions of copolymer F contain gelled particles, clarification of the solution may be effected by the addition of nitromethane, diethyl formamide, diethyl acetamide, etc.

Dyeing tests of these copolymers show improvements in dyeing susceptibility similar to those of Example I.

Example III

The procedure of Example I is repeated for the polymerization of the following monomer compositions:

| Acrylonitrile | Styrene | Mono-(1-cyanoethyl) Fumarate | Copolymer Soluble In |
|---|---|---|---|
| parts | parts | part | |
| 89 | 10 | 1 | DMF, DMA, TMU, etc. NO₂ME. |
| 79 | 20 | 1 | |
| 69 | 30 | 1 | Do. |
| 59 | 40 | 1 | Do. |

Dyeing tests of these copolymers show improvements in dye susceptibility similar to those obtained in Example I. In place of styrene, various styrene derivatives and other vinyl aromatics may be used as listed hereinafter.

Example IV

The procedure of Example I is repeated for the polymerization of the following monomer compositions:

| Acrylonitrile | Vinylidene Chloride | Mono-(2-cyanoethyl) Itaconate | Copolymer Soluble In |
|---|---|---|---|
| parts | parts | parts | |
| 85 | 5 | 10 | DMF, DMA, TMU, etc. |
| 65 | 25 | 10 | DMF, DMA, TMU, etc. |
| 45 | 45 | 10 | DMF, DMA, TMU, etc. |
| 25 | 65 | 10 | DMF, DMA, TMU, etc. |
| 5 | 85 | 10 | DMF, DMA, TMU, etc. |

With the above vinylidene chloride copolymers and similar copolymers, only the more active solvents, such as N,N-dimethyl acetamide, N,N-dimethyl formamide, N,N,N',N'-tetramethyl urea, etc., can be used as solvents. The above copolymers dye more readily and more thoroughly than similar copolymers containing no mono-cyanoalkyl itaconate.

As previously indicated, the solvent resistance of such copolymers as contain one or more monomer units in addition to those formed by the acrylonitrile and the ethylenic alpha, beta-dicarboxylic acid monoester of a cyanoalcohol is affected by the type and proportion of copolymerizing monomer or monomers used to replace part of the acrylonitrile. For example, copolymers containing small amounts of the cyanoalcohol monoester may contain various proportions of such monomer units as obtained from vinylidene chloride, methacrylonitrile, fumaronitrile and beta-cyano-acrylamide without considerable reduction in solvent resistance. Replacement of acrylonitrile units in the copolymers by vinyl chloride and styrene units result in copolymers of lowered solvent resistance, the amount of such lowering in resistance in each case depending on the amount substituted. In addition to the solvent resistance, certain other physical properties of the copolymers are affected by the presence of these additional units in the copolymers. The amount and character of the changes in physical properties of these copolymers depend again on the type and proportion of copolymerizing monomer or monomers used. For example, the tensile strength of an acrylonitrile-cyanoalcohol monoester copolymer of this invention will be decreased much more when a monomer having relatively weak secondary bonding forces, such as styrene or ethylene, is used to replace part of the acrylonitrile than when a monomer having relatively strong bonding forces, such as methacrylonitrile, fumaronitrile, beta-cyanoacrylamide, methyl beta-cyano-acrylate and vinylidene chloride, is used to replace part of the acrylonitrile. Moreover, the ability of these copolymers to form molecularly oriented shaped articles depends on the type and amount of the copolymerizing monomer or monomers used to replace acrylonitrile.

Other copolymerizable ethylenic compounds which may also be present in the polymerizable masses for copolymerization with acrylonitrile and cyanoalcohol monoesters include one or more of the following: acrylates, e. g., methyl acrylate; methacrylates, e. g., methyl methacrylate; acrylamides; methacrylamides; vinyl esters, such as vinyl acetate, vinyl propionate, etc.; maleates, such as dimethyl and diethyl maleates; fumarates, such as dimethyl and diethyl fumarates; itaconates, such as dimethyl and diethyl itaconates; itaconamide; isobutylene; ethylene; vinyl pyridines; vinyl carbazole, N-vinyl imides; ethylenic halides, such as vinyl fluoride, vinylidene fluoride, tetrafluoroethylene, trifluorochloroethylene; vinyl aryls, including styrenes, vinyl naphthalene, vinyl diphenyl, vinyl fluorene and derivatives such as alkyl, halogen, cyano, alkoxy derivatives, etc., such as styrene, alpha-methylstyrene and various derivatives such as alpha, para-dimethyl-styrene, etc., nuclear-substituted chlorostyrenes, e. g., ortho-, meta- and para-chloro-styrenes, dichloro-styrenes, trichloro-styrenes, etc., cyano-styrenes, such as ortho-, meta- and para-cyano-styrenes, dicyano-styrenes, etc., nuclear-substituted alkyl-styrenes, such as mono- and dimethyl-styrenes, mono- and diethyl-styrenes, mono- and di-isopropyl-styrenes, etc., cycloaliphatic-substituted styrenes, such as para-cyclohexyl-styrene, etc., fluoro-styrenes, such as ortho-, meta- and para-fluoro-styrenes, difluorostyrenes, etc., trifluoromethyl-styrenes, such as ortho-, meta- and para-trifluoromethyl-styrenes, di-(trifluoromethyl)-styrenes, etc., corresponding vinyl naphthalene derivatives and various other vinyl aryls or mixtures of any number of these with each other or with other polymerizable compounds.

The copolymers of this invention may be prepared by various polymerization systems, such as emulsion, suspension, mass and solution polymerizations. In addition to the monomers, the polymerizable mass may also contain other materials such as catalysts, e. g., peroxides, such as benzoyl peroxide, naphthyl peroxides, phthalyl peroxide, tertiary-butyl hydroperoxide, hydrogen peroxide, cyclohexyl hydroperoxide, tertiary-butyl perbenzoate, etc., persulfates, such as ammonium persulfate, etc., solvents, suspension or emulsion media, emulsifying agents, suspension agents, plasticizers, lubricants, etc.

For various purposes it may be desirable to chemically and physically modify the polymeric compositions of this invention by the presence of other materials. For example, these acrylonitrile-cyanoalcohol monoester copolymers may be modified with various agents such as other polymers, for example, polyvinyl chloride and polyvinylidene chloride, partial solvents or non-solvents, or mixtures of these, pigments, dyes, plasticizers, stabilizers, spinning agents, incrustation inhibitors, etc.

For use in the preparation of shaped articles, the molecular weights of the copolymers of this invention are preferably within the range of 10,000 to 250,000 or even higher, although polymers having molecular weights between 40,000 and 150,000 may be used with particular advantage. However, polymers of molecular weight less than 10,000 may be used for other purposes, such as impregnants, solvent-resistant coatings, etc. The molecular weight of the copolymer is dependent on the concentration of monomer or monomers, the amount and type of catalyst, temperature of reaction, etc.

As it is quite generally known in the field of high polymers, molecular orientation is usually indicated and identified by birefringence of polarized light, as under Nicol prisms, by increased density as compared to the density of the same polymer unoriented, and by characteristic X-ray diffraction patterns. When a material is crystalline or oriented, its X-ray diagram shows bright areas or spots for points of crystallization and dark areas for the non-crystalline regions. The intensity or number of these bright spots increases with the degree of orientation or crystallization. Amorphous or non-crystalline materials give X-ray diagrams having very few high lights or bright areas whereas crystalline or oriented materials give definite X-ray diffraction patterns. In these patterns there are definite relationships of the bright spots with regard to position and spacing which are generally characteristic of the composition of the material being X-rayed. In fibers or films the orientation usually follows the direction of drawing or stretching so that the orientation is parallel to the fiber axis or a major surface.

Useful fibers may be made from the solutions of the copolymers of this invention by dry spinning, as in the preparation of cellulose acetate fibers, or by wet spinning, as in the preparation of viscose rayon. In wet spinning, the solution of copolymer may be spun into a substance which is a non-solvent for the copolymers, but which is advantageously compatible with the solvent in which the copolymer is dissolved. For example, water, acetone, methyl alcohol, carbon disulfide, glycerine, chloroform, carbon tetrachloride, benzene, etc., may be used as a precipitating bath for N,N-dimethyl acetamide, N,N-dimethyl formamide, N,N,N',N'-tetramethyl urea and other solvent compositions of these copolymers. The extruded fibers, from which substantially all of the solvent has been removed in the spinning step, about 1–10 percent remaining in the shaped articles, may then be cold-drawn about 100–600 percent, preferably about 300–600 percent; and the drawn fiber heat-treated, usually at substantially constant length, at about 100–160° C. to effect further crystallization and removal of the remaining solvent. The term "heat-treated," as used herein, refers to the application of heat to an object, usually at a controlled temperature and usually by means of the medium surrounding the object.

Many of the acrylonitrile copolymers of this invention may be molecularly oriented. This is true when the major portion of the copolymer is acrylonitrile, or when the other copolymerizing monomers used in making such copolymers have substituent groups having secondary-valence bonding forces approximately equal to or greater than exhibited by the cyano group in acrylonitrile. For example, if such monomers as methacrylonitrile, fumaronitrile, vinylidene chloride, beta-cyano-acrylamide and methyl beta-cyano-acrylate are used with acrylonitrile and the monoester, a much higher proportion of these monomers may be in the copolymer molecules without destroying the ability of the acrylonitrile copolymers to be molecularly oriented than is possible when monomers having low secondary-valence bonding forces, such as styrene or ethylene, are used. Molecularly oriented, cold-drawn, shaped articles of particular usefulness are prepared from copolymer compositions containing in the polymer molecules at least about 50 percent acrylonitrile, 0.5–30 percent of an ethylenic alpha, beta-dicarboxylic acid monoester of a cyanoalcohol having less than 5 carbon atoms, and the balance, if any, consisting of one or more of the class consisting of vinylidene chloride, vinyl chloride, styrene, alpha-methyl-styrene, methacrylonitrile, fumaronitrile, beta-cyano-acrylamide and methyl beta-cyano-acrylate.

From the molecularly orientable copolymers of this invention, shaped articles, such as fibers, may be prepared having improved dyeing properties, low shrinkage in boiling water, sometimes as low as 3 to 5 percent or less of the cold-drawn or stretched article, good heat resistance, and tensile strength in the order of 4 to 8 grams per denier. Moreover, these properties make the fibers desirable in the manufacture of hosiery and for such all-purpose fabrics as used for blouses, shirts, suits, etc.

What is claimed is:

1. A polymeric acrylonitrile containing in the polymer molecule at least about 50 percent by weight of acrylonitrile and about 0.5–30 percent by weight of an ethylenic alpha, beta-dicarboxylic acid monoester of a cyanoalcohol, said dicarboxylic acid monoester being prepared from an acid of the class consisting of itaconic, maleic, fumaric, citraconic, and aconitic acids and a cyanoalcohol having the formula HO—Z—CN wherein Z is a divalent alkyl radical of less than 5 carbon atoms.

2. A polymeric acrylonitrile of claim 1, in which the mono-ester is an itaconic monoester.

3. A polymeric acrylonitrile of claim 1, in which the monoester is a maleate monoester.

4. A polymeric acrylonitrile of claim 1, in which the monoester is a fumarate monoester.

5. A polymeric acrylonitrile of claim 1, in which the monoester is an ester of cyanomethanol.

6. A polymeric acrylonitrile of claim 1, in which the monoester is an ester of 2-cyanoethanol.

7. A polymeric acrylonitrile of claim 1, in which the monoester is an itaconic monoester and the polymer molecule also contains 1–49.5 percent of vinyl chloride.

8. A polymeric acrylonitrile of claim 1, in which the monoester is a maleate monoester and the polymer molecule also contains 1–49.5 percent of vinyl chloride.

9. A polymeric acrylonitrile of claim 1, in which the monoester is a fumarate monoester and the polymer molecule also contains 1–49.5 percent of vinyl chloride.

10. A composition of matter comprising N,N,N',N' - tetramethyl urea and a polymeric acrylonitrile containing in the polymer molecule at least about 50 percent by weight of acrylonitrile and about 0.5–30 percent by weight of an ethylenic alpha, beta-dicarboxylic acid monoester of a cyanoalcohol, said dicarboxylic acid monoester being prepared from an acid of the class consisting of itaconic, maleic, fumaric, citraconic and aconitic acids, and a cyanoalcohol having the formula HO—Z—CN wherein Z is a divalent alkyl radical of less than 5 carbon atoms.

11. A shaped article comprising N,N,N',N'-tetramethyl urea and a polymeric acrylonitrile containing in the polymer molecule at least about 50 percent by weight of acrylonitrile and about 0.5–30 percent by weight of an ethylenic alpha, beta-dicarboxylic acid monoester of a cyanoalcohol, said dicarboxylic acid monoester being prepared from an acid of the class consisting of itaconic, maleic, fumaric, citraconic and aconitic acids, and a cyanoalcohol having the formula HO—Z—CN wherein Z is a divalent alkyl radical of less than 5 carbon atoms, said copolymer having a molecular weight of at least about 10,000.

12. A shaped article comprising the polymerization product of a polymerizable mass comprising acrylonitrile and an ethylenic alpha, beta-dicarboxylic acid monoester of a cyanoalcohol, said dicarboxylic acid monoester being prepared from an acid of the class consisting of itaconic, maleic, fumaric, citraconic and aconitic acids, and a cyanoalcohol having the formula

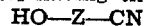
HO—Z—CN wherein Z is a divalent alkyl radical of less than 5 carbon atoms, said polymerization product having a molecular weight of at least about 10,000, and having at least about 50 percent by weight of acrylonitrile and about 0.5–30 percent by weight of said monoester in the polymer molecule.

13. A cold-drawn shaped article having molecular orientation, said article comprising a copolymer of acrylonitrile and at least about 50 percent by weight of acrylonitrile and about 0.5–30 percent by weight of an ethylenic alpha, beta-dicarboxylic acid monoester of a cyanoalcohol, said dicarboxylic acid monoester being prepared from an acid of the class consisting of itaconic, maleic, fumaric, citraconic and aconitic acids, and a cyanoalcohol having the formula HO—Z—CN wherein Z is a divalent alkyl radical of less than 5 carbon atoms, said copolymer having a molecular weight of at least about 10,000.

14. A cold-drawn shaped article of claim 13, in which the cyanoalcohol monoester is an itaconic monoester and the polymer molecule contains about 1–49.5 percent vinyl chloride.

15. A cold-drawn shaped article of claim 13, in which the cyanoalcohol monoester is a maleate monoester and the polymer molecule contains about 1–49.5 percent vinyl chloride.

16. A cold-drawn shaped article of claim 13, in which the cyanoalcohol monoester is a fumarate monoester and the polymer molecule contains about 1–49.5 percent vinyl chloride.

17. A composition of matter comprising a basic dye having amino groups therein and a polymeric acrylonitrile containing in the polymer molecule at least about 50 percent by weight of acrylonitrile and about 0.5–30 percent by weight of an ethylenic alpha, beta-dicarboxylic acid monoester of a cyanoalcohol, said dicarboxylic acid monoester being prepared from an acid of the class consisting of itaconic, maleic, fumaric, citraconic and aconitic acids and a cyanoalcohol having the formula HO—Z—CN wherein Z is a divalent alkyl radical of less than 5 carbon atoms.

18. A polymeric acrylonitrile of claim 1, in which the monoester is an ester of cyanomethanol and in which the polymer molecule contains about 1–49.5 percent of vinyl chloride.

19. A polymeric acrylonitrile of claim 1, in which the monoester is an ester of 2-cyanoethanol and in which the polymer molecule contains about 1–49.5 percent of vinyl chloride.

GAETANO F. D'ALELIO.

REFERENCES CITED

The following references are of record in the file of this patent:

UNITED STATES PATENTS

| Number | Name | Date |
| --- | --- | --- |
| 2,379,297 | Harmon et al. | June 26, 1945 |